(12) United States Patent
Nishino

(10) Patent No.: US 8,933,662 B2
(45) Date of Patent: Jan. 13, 2015

(54) CHARGING APPARATUS FOR LEAD STORAGE BATTERY

(75) Inventor: Shuzo Nishino, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 351 days.

(21) Appl. No.: 13/558,871

(22) Filed: Jul. 26, 2012

(65) Prior Publication Data

US 2014/0028250 A1  Jan. 30, 2014

(51) Int. Cl.
*H02J 7/00* (2006.01)

(52) U.S. Cl.
USPC .......................................................... 320/108

(58) Field of Classification Search
CPC ........ H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| | | | |
|---|---|---|---|
| 6,239,879 B1 | 5/2001 | Hay | 358/1.15 |
| 7,808,299 B2 * | 10/2010 | Mao et al. | 327/530 |
| 2010/0231174 A1 * | 9/2010 | Li et al. | 320/145 |
| 2012/0200255 A1 * | 8/2012 | Kato et al. | 320/108 |
| 2012/0326661 A1 * | 12/2012 | Kada et al. | 320/108 |
| 2013/0187605 A1 * | 7/2013 | Potts | 320/112 |
| 2013/0235632 A1 * | 9/2013 | Knoedgen | 363/126 |
| 2013/0342170 A1 * | 12/2013 | Yeon et al. | 320/135 |

FOREIGN PATENT DOCUMENTS

| | | | |
|---|---|---|---|
| EP | 2637293 A1 * | 3/2012 | ............ H02M 3/335 |
| JP | 03-107337 | 5/1991 | ................ H02J 7/00 |
| JP | 09-191580 | 7/1997 | ................ H02J 7/00 |
| JP | 10-136573 | 5/1998 | ................ H02J 7/00 |
| JP | 10-136588 | 5/1998 | ................ H02J 7/00 |
| JP | 2000-58356 | 2/2000 | ............. H01F 38/14 |
| JP | 2000-217279 | 8/2000 | ................ H02J 7/00 |
| JP | 2001-078369 | 3/2001 | ................ H02J 7/04 |
| JP | 2002-049428 | 2/2002 | ................ G05F 1/12 |
| JP | 2007-012546 | 1/2007 | ............ H01M 10/44 |
| JP | 4068268 | 1/2008 | ................ H02J 7/04 |

OTHER PUBLICATIONS

Japanese Office Action dispatched on Aug. 20, 2013 in corresponding Japanese Patent App. No. 2010-006341; 2 pages.

* cited by examiner

*Primary Examiner* — Stacy Whitmore
*Assistant Examiner* — Magid Dimyan
(74) *Attorney, Agent, or Firm* — Kusner & Jaffe

(57) ABSTRACT

A charging apparatus 10 includes: a half-wave rectifier 21 that half-wave rectifies an alternating current supplied from a commercial power supply 11; a radiofrequency generating circuit 22 that converts the output current of the half-wave rectifier 21 to a radiofrequency current with a predetermined frequency and outputs the radiofrequency current; an induction coil 23 that is fed with the radiofrequency current from the radiofrequency generating circuit 22; a power receiving coil 24 that receives an electromotive force induced by a magnetic flux produced on the induction coil 23; a resonant capacitor 25 that is connected in parallel with the power receiving coil 24 and forms a resonant circuit with the power receiving coil 24 at the predetermined frequency; and a full-wave rectifier 27 that full-wave rectifies the output current of the parallel resonant circuit and supplies the current to a lead storage battery 12.

5 Claims, 5 Drawing Sheets

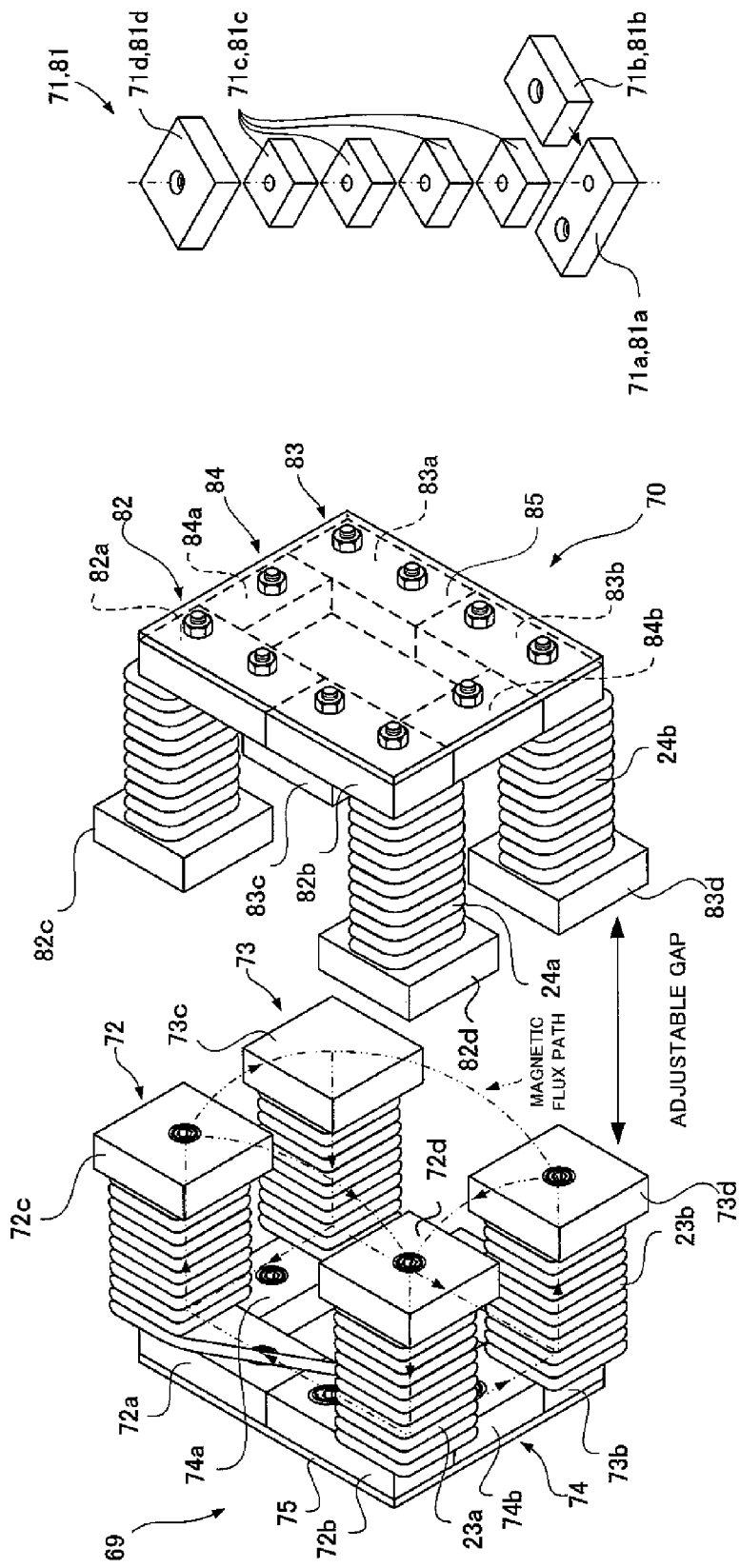

CHARGING APPARATUS FOR LEAD STORAGE BATTERY

FIELD OF THE INVENTION

The present invention relates to a charging apparatus for a lead storage battery and particularly relates to a charging apparatus that charges a lead storage battery installed in a mobile unit from an induction line.

BACKGROUND OF THE INVENTION

Japanese Patent No. 4068268 discloses an example of a known method of charging a lead storage battery.

An object of the method of charging a lead storage battery in Japanese Patent No. 4068268 is to solve a problem, "in a quick charge method using a relatively large constant current of at least 1.0 C, a battery voltage reaches at least a gas generating voltage and generates oxygen gas and hydrogen gas before charging of a sufficient amount, leading to a reduction in charging efficiency and degradation of life characteristics". The charging method is pulse charging in which a lead storage battery is charged by a constant current of at least 1.0 C for a predetermined energization time $T_1$, and then the charging of the lead storage battery is stopped for a predetermined stop time $T_2$. The energization time $T_1$ ranges from 0.005 seconds to less than 0.1 seconds, and the stop time $T_2$ is set below 0.1 seconds. The energization time $T_1$ and the stop time $T_2$ are set so as to satisfy the relationship of $T_1 \leq T_2 \leq 3T_1$. According to "Pulse Charging Characteristics of Controlvalve Lead Battery for Electric Vehicle" in "1999 IEEJ National Convention Journal 4" issued on Feb. 10, 1999 by IEEJ National Convention Committee, the pulse is disclosed as a perfect square wave.

According to this method, when a battery is charged to a certain degree, polarization components rapidly increase a voltage to at least a gas generation voltage and gas is generated from electrodes during energization, reducing charging efficiency. Such an increase in voltage by the polarization components can be suppressed by shortening the energization time $T_1$ and the stop time $T_2$, enabling efficient charging.

However, the known method of charging a lead storage battery does not disclose a charging apparatus, that is, a specific method of generating a pulse specified by the energization time $T_1$ and the stop time $T_2$ with a constant current of at least 1 C. Specifically, for example, assuming that 1 C of a lead storage battery is an ordinary current of 30 A, a charging apparatus that generates a pulse with a perfect square wave applies a current of at least 30 A (at least 1.0 C), e.g., 50 A for a time period of at least 0.005 seconds to less than 0.1 seconds and stops the current application for less than 0.1 seconds, resulting in a complicated circuit configuration. Thus, it is actually difficult to achieve an inexpensive apparatus, leading to extremely high cost.

Moreover, for various kinds (ratings) of lead storage batteries with different rated currents, a simple adjustment to a charging current has been demanded.

DISCLOSURE OF THE INVENTION

The present invention has been devised to solve these problems and has as its object to provide a charging apparatus for a lead storage battery by which a pulse charging method can be implemented with a simple apparatus configuration and a charging current can be easily adjusted.

In order to attain the object, the present invention is a charging apparatus for charging a lead storage battery by means of a commercial power supply, the charging apparatus including: a half-wave rectifier that half-wave rectifies an alternating current supplied from the commercial power supply; a radiofrequency generating circuit that converts an output current half-wave rectified by the half-wave rectifier to a radiofrequency current with a predetermined frequency and outputs the radiofrequency current; an induction coil that is fed with the radiofrequency current from the radiofrequency generating circuit; a power receiving coil that is opposed to the induction coil and receives an electromotive force induced by a magnetic flux produced on the induction coil; a resonant capacitor that is connected in parallel with the power receiving coil and forms a resonant circuit with the power receiving coil at the predetermined frequency; and a full-wave rectifier that full-wave rectifies the output current of the parallel resonant circuit and supplies the current to the lead storage battery.

In this configuration, a smoothing circuit is not provided between the half-wave rectifier and the radiofrequency generating circuit. Thus, a radiofrequency current having a predetermined frequency is supplied from the radiofrequency generating circuit to the induction coil with an envelope of a half-cycle current waveform, the current being blocked for a half cycle at each half cycle of the frequency of the commercial power supply. Moreover, an electromotive force with the predetermined frequency is induced on the power receiving coil. The electromotive force has an envelope of a half-cycle current waveform of the frequency of the commercial power supply. The output current of the parallel resonant circuit increases or decreases according to the induced electromotive force regardless of a load, suppressing a peak current. The current is then full-wave rectified by the full-wave rectifier, so that the waveform of the output current of the full-wave rectifier is blocked for a half cycle substantially at each half cycle of the frequency of the commercial power supply. The lead storage battery is charged with a parabolic half-wave current that is not a constant current, that is, the lead storage battery is charged in a half cycle of the commercial frequency and is not charged in the subsequent half cycle. The pulse charging can quickly charge the lead storage battery and reliably extend the life of the lead storage battery.

Furthermore, the lead storage battery is charged from the full-wave rectifier through a DC choke.

With this configuration, the effect of the DC choke keeps the passage of the high-frequency output current of the full-wave rectifier, allowing a current outputted to the lead storage battery to have a smooth half-cycle waveform of the commercial power supply with an envelope of a high-frequency waveform, thereby avoiding the occurrence of noise.

The charging apparatus for a lead storage battery according to the present invention further includes an insulating transformer between the resonant circuit and the full-wave rectifier, wherein the current supplied to the lead storage battery is set according to the turns ratio of the primary winding and the secondary winding of the insulating transformer.

With this configuration, an optimum current can be obtained for pulse charging of the lead storage battery according to the turns ratio of the insulating transformer. Further, the insulating transformer having a high-frequency input can be reduced in size and cost.

Moreover, the current supplied to the lead storage battery is made variable by changing a gap between the induction coil and the power receiving coil.

With this configuration, an electromotive force induced on the power receiving coil varies with a change of the gap between the induction coil and the power receiving coil, leading to a change of an output current generated from the parallel resonant circuit. Thus, a charging current to the lead storage battery is made variable. A peak current and a mean current can be adjusted according to the capacity (rating) of the lead storage battery by adjusting the gap.

BRIEF DESCRIPTION OF THE DRAWINGS

FIG. 5A is a perspective view illustrating an induction coil and a power receiving coil in the charging apparatus for the lead storage battery; and FIG. 5B is a structural diagram illustrating a principle part of ferrite members constituting the induction coil and the power receiving coil in the charging apparatus for the lead storage battery.

DESCRIPTION OF THE EMBODIMENTS

An embodiment of the present invention will be described below with reference to the accompanying drawings.
[Basic Circuit]

Figure 1:
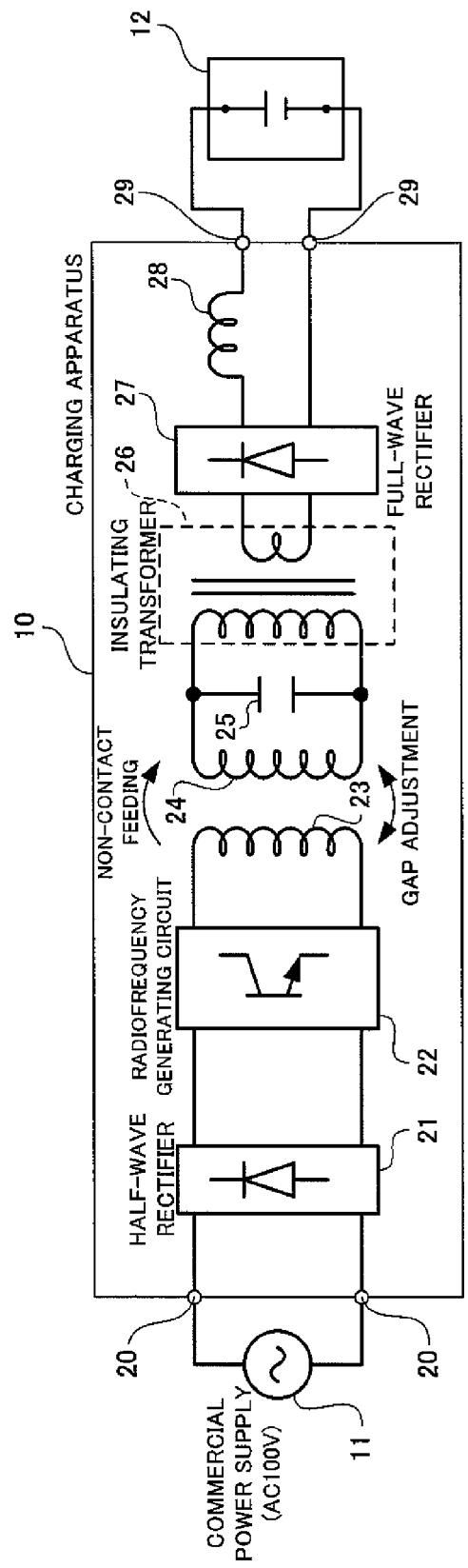
FIG. 1 is a basic circuit diagram illustrating a charging apparatus for a lead storage battery according to an embodiment of the present invention.

FIG. 1 is a basic circuit diagram illustrating a charging apparatus for a lead storage battery according to the embodiment of the present invention.

As illustrated in FIG. 1, a charging apparatus 10 for a lead storage battery is fed with power from a commercial power supply 11 and charges a lead storage battery 12. The charging apparatus 10 includes a feeding input terminal 20, a half-wave rectifier 21, a radiofrequency generating circuit 22, an induction coil 23, a power receiving coil 24, a resonant capacitor 25, an insulating transformer 26, a full-wave rectifier 27, a DC choke 28, and a charging output terminal 29.

Specifically, the charging apparatus 10 for the lead storage battery includes:

the feeding input terminal 20 connected to the AC commercial power supply 11;

the half-wave rectifier 21 that half-wave rectifies, to a direct current, an alternating current fed from the commercial power supply 11 through the feeding input terminal 20 and supplies the half-wave rectified direct current;

the radiofrequency generating circuit 22 that converts, to a radiofrequency current with a predetermined frequency, an output current half-wave rectified by the half-wave rectifier 21, and outputs the radiofrequency current;

the induction coil 23 that receives the radiofrequency current from the radiofrequency generating circuit 22;

the power receiving coil 24 that is opposed to the induction coil 23 with an adjustable gap between the coils and receives an electromotive force induced by a magnetic flux produced by the induction coil 23;

the resonant capacitor 25 that is connected in parallel with the power receiving coil 24 and forms a parallel resonant circuit with the power receiving coil 24 at the predetermined frequency;

the insulating transformer (high-frequency transformer) 26 that includes a primary winding having two ends connected to two ends of the resonant capacitor 25, and sets a charging current (e.g., 3.0 C) supplied to the lead storage battery 12 according to the turns ratio of the primary winding to a secondary winding;

the full-wave rectifier 27 that is connected to two ends of the secondary winding of the insulating transformer 26 to full-wave rectify the output current of the insulating transformer 26;

the DC choke 28 with one end connected to the positive output terminal of the full-wave rectifier 27; and the charging output terminal 29 including a positive output terminal connected to the other end of the DC choke 28 and a negative output terminal connected to the negative output terminal of the full-wave rectifier 27.

The positive output terminal of the charging output terminal 29 is connected to the positive electrode of the lead storage battery 12, and the negative output terminal of the charging output terminal 29 is connected to the negative electrode of the lead storage battery 12.

Figure 2:
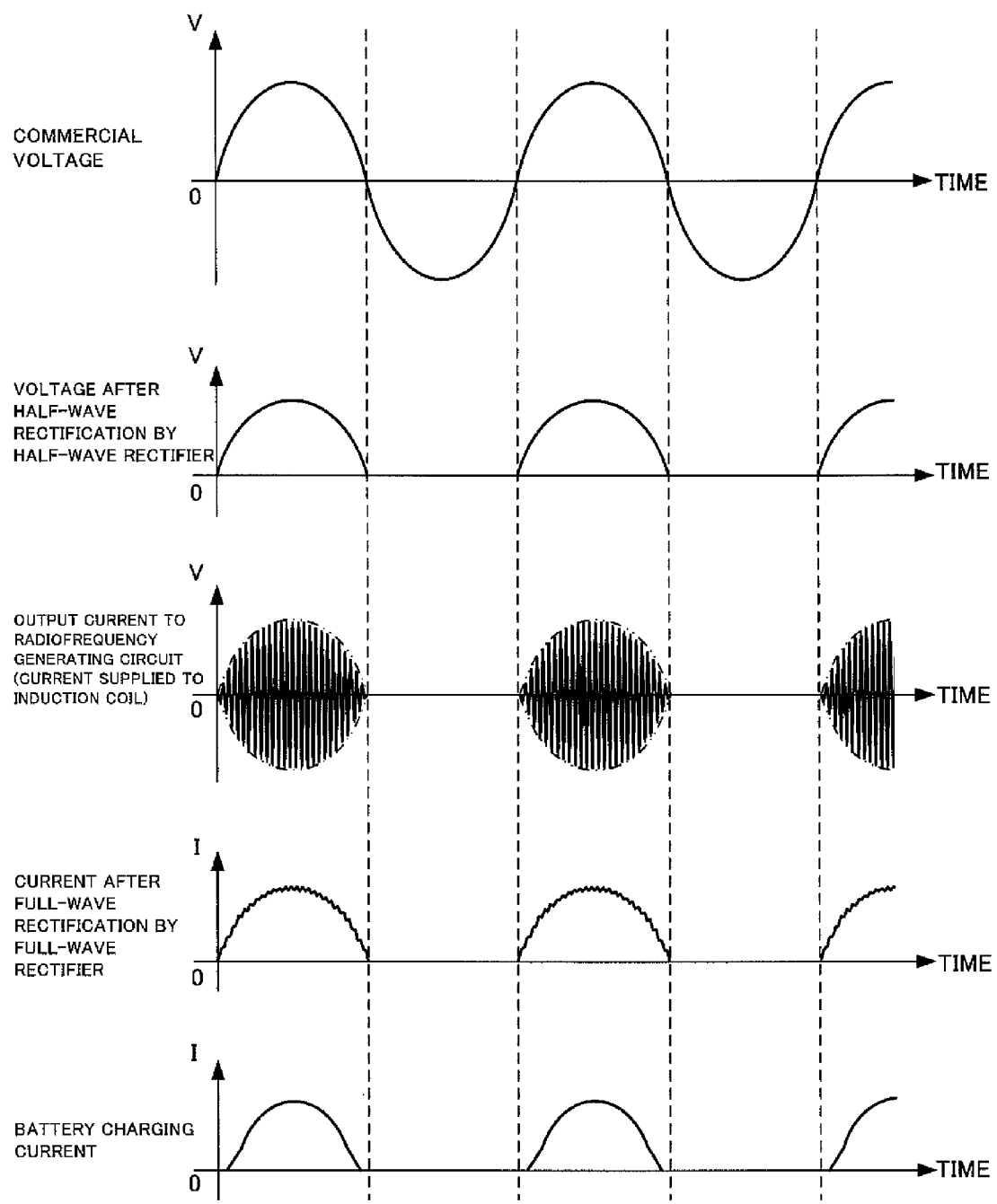
FIG. 2 is a characteristic diagram of the charging apparatus for the lead storage battery.

Referring to a characteristic diagram in FIG. 2, the effect of the circuit configuration of the charging apparatus 10 will be described below.

Before charging is started, the charging output terminal 29 is connected to the lead storage battery 12 to be charged at, for example, 1.0 C equivalent to 30 A, and then a gap between the induction coil 23 and the power receiving coil 24 is adjusted according to the rated current of the connected lead storage battery 12. An electromotive force induced on the power receiving coil 24 is adjusted according to the gap between the induction coil 23 and the power receiving coil 24, thereby adjusting a current outputted from the parallel resonant circuit (a current increases or decreases according to the induced electromotive force regardless of a load). For example, assuming that a current supplied to the lead storage battery 12 with 1.0 C of 30 A is set with a constant gap according to the turns ratio of the primary winding to the secondary winding of the insulating transformer 26 (for example, in the case of 3.0 C=90 A), in the case where 1.0 C of the lead storage battery 12 to be charged is smaller than 30 A, the gap is increased, whereas in the case where 1.0 C of the lead storage battery 12 is larger than 30 A, the gap is reduced.

Then, the commercial power supply 11 is connected to the feeding input terminal 20.

1. When the commercial power supply 11 is connected to the feeding input terminal 20 of the charging apparatus 10, an alternating current is supplied to the half-wave rectifier 21, and then a direct current half-wave rectified in the half-wave rectifier 21 is supplied to the radiofrequency generating circuit 22.

2. The radiofrequency generating circuit 22 generates a radiofrequency current having a predetermined frequency (e.g., 10 kHz) with an envelope of a half-cycle waveform such that the current is blocked for a half cycle at each half cycle of the frequency of the commercial power supply 11, and then the radiofrequency generating circuit 22 outputs the current to the induction coil 23.

3. An electromotive force with the predetermined frequency is induced on the power receiving coil 24 by a magnetic flux produced by the induction coil 23. The electromotive force has an envelope of a half-cycle waveform of the frequency of the commercial power supply 11. The output current of the parallel resonant circuit increases or decreases with the induced electromotive force. At this point, the effect of the parallel resonant circuit increases or reduces the output current of the parallel resonant circuit regardless of the load. Thus, a reduction in load does not extremely increase the output current and a change of the load does not stop charging of a half-wave current, suppressing the peak current of the output current of the parallel resonant circuit. Thus, a current for charging the lead storage battery 12 can be optimized to a desired current for charging.
4. The current outputted from the parallel resonant circuit is converted by the insulating transformer 26 to a current (e.g., 3.0 C) to be supplied to the lead storage battery 12.
5. The current with the predetermined frequency is full-wave rectified by the full-wave rectifier 27, so that the output current of the full-wave rectifier 27 has a high-frequency waveform (blocked for a half cycle substantially at each half cycle of a commercial frequency) with an envelope of a commercial frequency waveform that pauses substantially like a voltage after half-wave rectification by the half-wave rectifier 21. Then, the radiofrequency current with the envelope of the commercial frequency waveform is smoothed by the effect of the DC choke 28 that keeps the passage of the current, forming a smooth half-cycle waveform. The current is then outputted to the charging output terminal 29.
6. The lead storage battery 12 is fed with the half-wave current with the smooth waveform from the charging output terminal 29 substantially at each half cycle of the frequency of the commercial power supply. The charging current is zero in the subsequent half cycle. Since the lead storage battery 12 is not charged by a current lower than a predetermined current, the lead storage battery 12 is charged when the current value of the half-wave current reaches or exceeds that of the predetermined current. Specifically, the lead storage battery 12 is charged by pulse charging with a parabolic half-wave current that is not a constant current. The lead storage battery 12 is charged in a half cycle of the commercial frequency with a suppressed peak current but is not charged in the subsequent half cycle.

As has been discussed, according to the present embodiment, the absence of a smoothing circuit between the half-wave rectifier 21 and the radiofrequency generating circuit 22 allows current supply to the lead storage battery 12 with a waveform blocked for a half cycle at each half cycle of the frequency of the commercial power supply 11, through the radiofrequency generating circuit 22, the induction coil 23, the power receiving coil 24, the resonant capacitor 25, the insulating transformer 26, and the full-wave rectifier 27. The lead storage battery 12 can be charged in a half cycle of the commercial frequency by pulse charging with a parabolic half-wave current that is not a constant current, with the half-cycle waveform of the commercial frequency. Thus, the lead storage battery 12 can be quickly charged with a simple circuit configuration and have an extended life.

According to the present embodiment, the effect of the DC choke 28 can supply a half-wave current with a smooth half-cycle waveform to the lead storage battery 12, thereby avoiding the occurrence of noise.

According to the present embodiment, the insulating transformer 26 can supply a charging current (e.g., a peak current of 90 A) according to the rated current of the lead storage battery 12 to be charged.

According to the present embodiment, the insulating transformer 26 used in a noncontact manner allows the charging apparatus 10 with a simple circuit configuration to generate a pulse with a large current, e.g., 50 A or 100 A. The insulating transformer 26 having a high-frequency input can be reduced in size and cost. Moreover, the absence of a smoothing circuit between the half-wave rectifier 21 and the radiofrequency generating circuit 22 can eliminate the need for a smoothing capacitor, inexpensively achieving the charging apparatus 10 with a simple circuit configuration, high efficiency, and a small size.

According to the present embodiment, in the case where the lead storage battery 12 is charged with a different rated current from that set in the insulating transformer 26, an optimum charging current can be supplied by adjusting a gap between the induction coil 23 and the power receiving coil 24. Specifically, the lead storage battery 12 can be adjusted to an optimum peak current and mean current according to the capacity (rating) of the lead storage battery 12 by adjusting the gap.

In the present embodiment, the lead storage battery 12 is a main charging target. Needless to say, the present embodiment is applicable to a storage battery effectively charged by pulse charging.

[Detailed Circuit]

Figure 3:
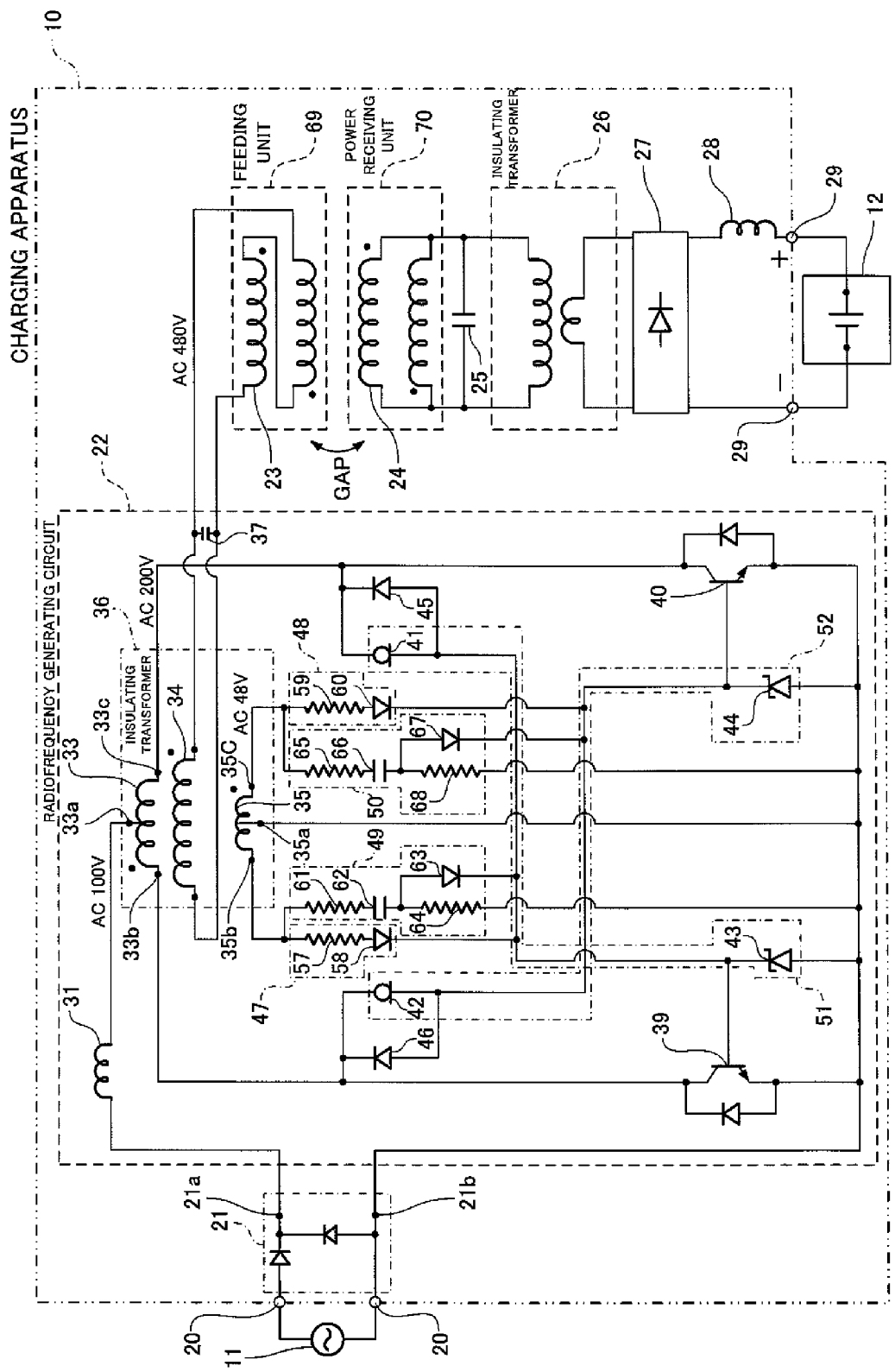
FIG. 3 is a detailed circuit diagram of the charging apparatus for the lead storage battery.

FIG. 3 illustrates the specific circuit configuration of the radiofrequency generating circuit 22. The radiofrequency generating circuit 22 in FIG. 3 constitutes a self-exciting push-pull circuit, eliminating the need for a driving circuit for transistors 39 and 40, which will be described later.

The radiofrequency generating circuit 22 includes:

a DC choke 31 that has one end connected to a positive output terminal 21a of the half-wave rectifier 21 and is fed with a direct current from the half-wave rectifier 21;

an insulating transformer 36 including a center-tapped primary coil 33 having a center tap 33a connected to the other end of the DC choke 31, a secondary coil 34 connected to the induction coil 23, and a center-tapped tertiary coil 35 having a center tap 35a connected to a negative output terminal 21b of the rectifier 21;

a resonant capacitor 37 that is connected in parallel with two ends of the secondary coil 34 and forms a resonant circuit with the induction coil 23 at a predetermined frequency;

the first transistor 39 connected between one end 33b of the center-tapped primary coil 33 and the negative output terminal 21b of the rectifier 21;

the second transistor 40 connected between the other end 33c of the center-tapped primary coil 33 and the negative output terminal 21b of the rectifier 21;

a first constant-current diode 41 having an anode connected to the other end 33c of the center-tapped primary coil 33 with a constant current of, e.g., 10 mA;

a first Zener diode 43 having a cathode connected to the cathode of the first constant-current diode 41 and the gate of the first transistor 39 and an anode connected to the negative output terminal 21b of the rectifier 21;

a second constant-current diode 42 having an anode connected to the one end 33b of the center-tapped primary coil 33 with a constant current of, e.g., 10 mA;

a second Zener diode 44 having a cathode connected to the cathode of the second constant-current diode 42 and the gate of the second transistor 40 and an anode connected to the negative output terminal 21b of the half-wave rectifier 21;

a first switching diode 45 having an anode connected to the cathode of the first constant-current diode 41 and a cathode connected to the other end 33c of the center-tapped primary coil 33;

a second switching diode 46 having an anode connected to the cathode of the second constant-current diode 42 and a cathode connected to the one end 33b of the center-tapped primary coil 33;

a first driving circuit 47 that supplies a charge to the gate of the first transistor 39;

a second driving circuit 48 that supplies a charge to the gate of the second transistor 40;

a first lead circuit 49 that quickly supplies a charge to the gate of the first transistor 39;

a second lead circuit 50 that quickly supplies a charge to the gate of the second transistor 40; and an air cooling fin (not shown) that contains these components.

The turns ratio of the center-tapped primary coil 33, the secondary coil 34, and the center-tapped tertiary coil 35 of the insulating transformer 36 is set such that a voltage across the secondary coil 34 is, for example, AC 480 V and a voltage across the center-tapped tertiary coil 35 considerably drops to, for example, 48 V when a voltage across the center-tapped primary coil 33 is AC 200V.

The first constant-current diode 41 and the first Zener diode 43 constitute a first startup circuit 51 that applies a voltage to the gate of the first transistor 39 to turn on the first transistor 39 (conducting). The second constant-current diode 42 and the second Zener diode 44 constitute a second startup circuit 52 that applies a voltage to the gate of the second transistor 40 to turn on the second transistor 40 (conducting).

The first driving circuit 47 includes:

a first branch resistor 57 having one end connected to one end 35*b* of the center-tapped tertiary coil 35; and a first branch diode 58 having an anode connected to the other end of the first branch resistor 57 and a cathode connected to the cathode of the first constant-current diode 41 and the gate of the first transistor 39.

The second driving circuit 48 includes:

a second branch resistor 59 having one end connected to the other end 35*c* of the center-tapped tertiary coil 35; and a second branch diode 60 having an anode connected to the other end of the second branch resistor 59 and a cathode connected to the cathode of the second constant-current diode 42 and the gate of the second transistor 40.

The first lead circuit 49 includes:

a first lead resistor 61 having one end connected to the one end 35*b* of the center-tapped tertiary coil 35;

a first lead capacitor 62 having one end connected to the other end of the first lead resistor 61;

a first lead diode 63 having an anode connected to the other end of the first lead capacitor 62 and a cathode connected to the cathode of the first constant-current diode 41 and the gate of the first transistor 39; and a first resistor 64 connected between the anode of the first lead diode 63 and the negative output terminal 21*b* of the rectifier 21.

The second lead circuit 50 includes:

a second lead resistor 65 having one end connected to the other end 35*c* of the center-tapped tertiary coil 35;

a second lead capacitor 66 having one end connected to the other end of the second lead resistor 65;

a second lead diode 67 having an anode connected to the other end of the second lead capacitor 66 and a cathode connected to the cathode of the second constant-current diode 42 and the gate of the second transistor 40; and a second resistor 68 connected between the anode of the second lead diode 67 and the negative output terminal 21*b* of the rectifier 21.

The induction coil 23 is wound around a ferrite core member that forms a magnetic core, constituting a feeding unit 69. The power receiving coil 24 is wound around a ferrite core member that forms a magnetic core, constituting a power receiving unit 70.

As illustrated in FIG. 5, the feeding unit 69 includes:

a first ferrite 72 that is a combination of flat ferrite core members 71*a*, 71*c*, and 71*d* and is channel-shaped in side view;

a second ferrite 73 that is a combination of the flat ferrite core members 71*a*, 71*c*, and 71*d* opposed to the first ferrite 72 and is channel-shaped in side view;

a third ferrite 74 (74*a*, 74*b*) that includes a flat ferrite core member 71*b* and connects ferrites 72*a* and 72*b* and ferrites 73*a* and 73*b*, the ferrites 72*a* and 72*b* being located at the respective bottoms of ferrites 72*c* and 72*d* forming projecting portions on two sides of the first ferrite 72, the ferrites 73*a* and 73*b* being located at the respective bottoms of ferrites 73*c* and 73*d* forming projecting portions on two sides of the second ferrite 73;

an induction coil 23*a* wound around the ferrites 72*c* and 72*d* forming the projecting portions on the two sides of the first ferrite 72;

an induction coil 23*b* that is connected in series with the induction coil 23*a* and is wound around the ferrites 73*c* and 73*d* forming the projecting portions on the two sides of the second ferrite 73 such that the induction coil 23*b* has reversed polarity from the induction coil 23*a*; and an aluminum flooring material 75 that supports the first ferrite 72 and the second ferrite 73. The induction coil 23*a* and the induction coil 23*b* form the induction coil 23.

Power fed to the induction coils 23*a* and 23*b* by the configuration of the feeding unit 69 produces a magnetic flux in a magnetic flux path illustrated in FIG. 5A.

The magnetic flux path is formed in four patterns:

the ferrite 72*b* at the bottom of the other side of the first ferrite 72—the ferrite 72*a* at the bottom of one side of the first ferrite 72—the ferrite 72*c* of the projecting portion on one side of the first ferrite 72—the ferrite 72*d* of the projecting portion on the other side of the first ferrite 72—the ferrite 72*b* at the bottom of the other side of the first ferrite 72;

the ferrite 72*a* at the bottom of one side of the first ferrite 72—the ferrite 72*c* of the projecting portion on one side of the first ferrite 72—the ferrite 73*c* of the projecting portion on one side of the second ferrite 73—the ferrite 73*a* at the bottom of one side of the second ferrite 73—the third ferrite 74*a*—the ferrite 72*a* at the bottom of one side of the first ferrite 72;

the ferrite 73*a* at the bottom of one side of the second ferrite 73—the ferrite 73*b* at the bottom of the other side of the second ferrite 73—the ferrite 73*d* of the projecting portion on the other side of the second ferrite 73—the ferrite 73*c* of the projecting portion on one side of the second ferrite 73—the ferrite 73*a* at the bottom on one side of the second ferrite; and the ferrite 73*b* at the bottom of the other side of the second ferrite 73—the ferrite 73*d* of the projecting portion on the other side of the second ferrite 73—the ferrite 72*d* of the projecting portion on the other side of the first ferrite 72—the ferrite 72*b* at the bottom of the other side of the first ferrite 72—the third ferrite 74*b*—the ferrite 73*b* at the bottom of the other side of the second ferrite 73.

These four patterns of the magnetic flux path can maximize a magnetic flux passing through the power receiving unit 70 from the feeding unit 69, improving power transmission efficiency.

As illustrated in FIG. 5A, the power receiving unit 70 includes:

a first ferrite 82 that is a combination of flat ferrite core members 81*a*, 81*c*, and 81*d* and is channel-shaped in side view;

a second ferrite 83 that is a combination of the flat ferrite core members 81*a*, 81*c*, and 81*d* opposed to the first ferrite 82 and is channel-shaped in side view;

a third ferrite 84 (84*a*, 84*b*) that includes a flat ferrite core member 81*b* and connects ferrites 82*a* and 82*b* and ferrites 83*a* and 83*b*, the ferrites 82*a* and 82*b* being located at the respective bottoms of ferrites 82*c* and 82*d* forming projecting portions on two sides of the first ferrite 82, the ferrites 83*a* and 83*b* being located at the respective bottoms of ferrites 83*c* and 83*d* forming projecting portions on two sides of the second ferrite 83;

a power receiving coil 24*a* wound around the ferrites 82*c* and 82*d* forming the projecting portions on the two sides of the first ferrite 82;

a power receiving coil 24*b* that is connected in parallel with the power receiving coil 24*a* and is wound around the ferrites 83*c* and 83*d* forming the projecting portions on the two sides of the second ferrite 83 such that the power receiving coil 24*b* has reversed polarity from the power receiving coil 24*a*; and an aluminum flooring material 85 that supports the first ferrite 82 and the second ferrite 83. The power receiving coil 24*a* and the power receiving coil 24*b* form the power receiving coil 24.

As illustrated in FIG. 5A, the power receiving unit 70 (power receiving coil 24) is disposed such that four ferrite core members 81 on the ends of the projecting portions of the power receiving unit 70 are opposed to ferrite core members 71 on the ends of the four projecting portions of the feeding unit 69.

Figure 4:
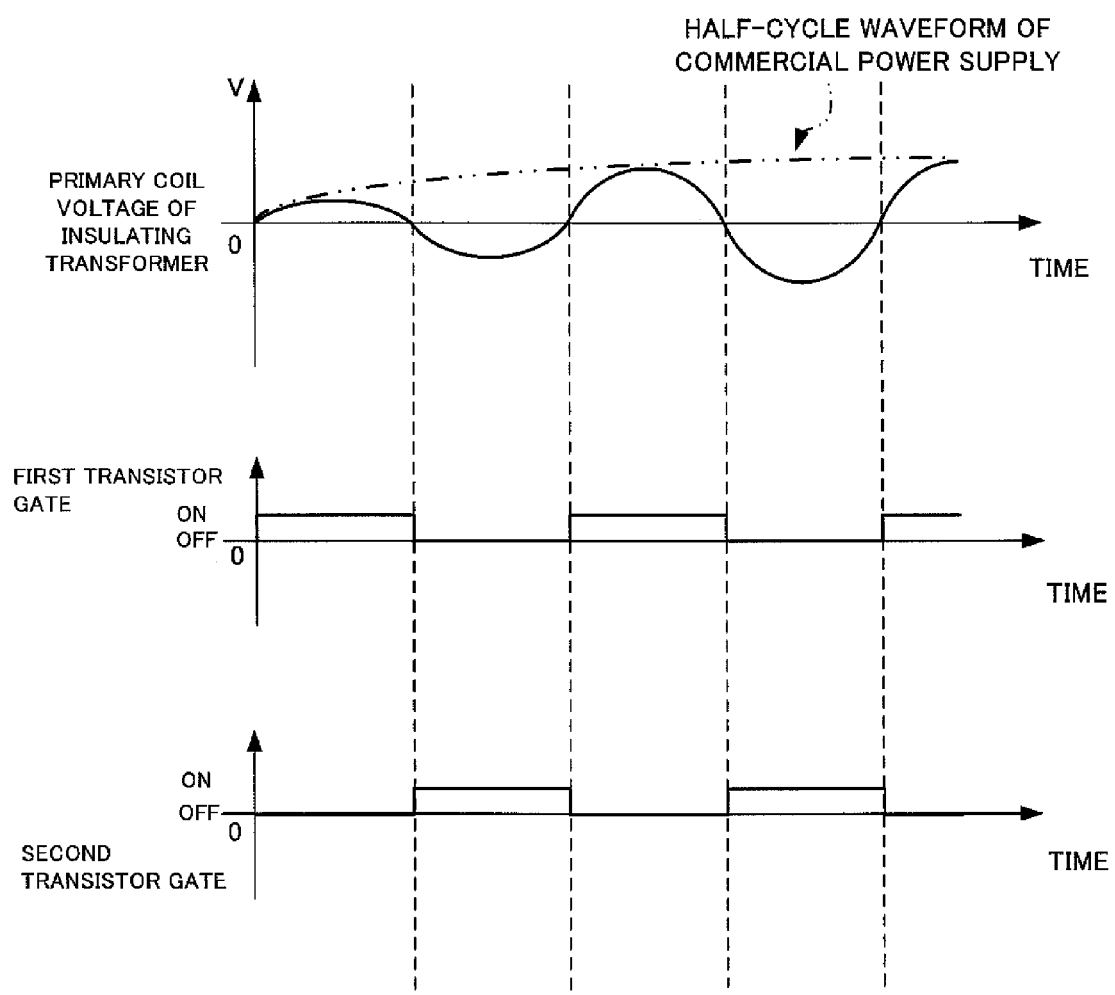
FIG. 4 is a characteristic diagram of a radiofrequency generating circuit in the charging apparatus for the lead storage battery.

Referring to FIG. 4, the operations of the configuration of the detailed circuit will be described below.

1. When the charging apparatus 10 is connected to the commercial power supply 11, an alternating current is supplied to the half-wave rectifier 21, and then a direct current rectified by the half-wave rectifier 21 is supplied to the DC choke 31 of the radiofrequency generating circuit 22. In this state, the first transistor 39 and the second transistor 40 are both turned off (non-conducting).

2. Even in the case of components having the same rating, the direct current supplied to the DC choke 31 varies in flowability because of variations in the characteristics of the first transistor 39 and the second transistor 40. In this case, a current flows to the first Zener diode 43 from the other end 33*c* of the center-tapped primary coil 33 through the first constant-current diode 41, and the gate voltage of the first transistor 39 reaches at least a threshold voltage, so that the first transistor 39 (conducting) is first turned on (the gate of the first transistor 39 is turned on in FIG. 4).

When the first transistor 39 is turned on (conducting), a current passes through the first transistor 39 and the negative output terminal 21*b* of the rectifier 21 from the one end 33*b* of the primary coil 33.

At this point, a voltage is substantially 0 V at the junction point of the one end 33*b* of the center-tapped primary coil 33 and the collector of the first transistor 39. Thus, a charge at the gate of the second transistor 40 flows to the junction point of the one end of the center-tapped primary coil and the collector of the first transistor 39 through the second switching diode 46, discharging the gate of the second transistor 40. The second transistor 40 is completely turned off (non-conducting), preventing the gate voltage of the second transistor 40 from exceeding the threshold voltage.

3. At this point, an electromotive force is generated on the tertiary coil 35 by a magnetic flux produced on the primary coil 33 by a current passing through the first transistor 39 and the negative output terminal 21*b* of the rectifier 21 from the one end 33*b* of the primary coil 33. Since the tertiary coil 35 has reversed polarity, an induction current passes through the tertiary coil 35 in the opposite direction from a current passing through the primary coil 33. The induction current passes through the second lead resistor 65, the second lead capacitor 66, the second resistor 68, and the center tap 35*a* of the tertiary coil 35 from the other end 35*c* of the tertiary coil 35, which forms a second closed loop that accumulates a charge in the second lead capacitor 66. Meanwhile, the induction current flows to the junction point of the one end 33*b* of the center-tapped primary coil 33 and the collector of the first transistor 39 from the other end 35*c* of the tertiary coil 35 through the second lead resistor 65, the second lead capacitor 66, the second lead diode 67, and the second switching diode 46, and flows to the junction point of the one end 33*b* of the center-tapped primary coil 33 and the collector of the first transistor 39 from the other end 35*c* of the tertiary coil 35 through the second branch resistor 59, the second branch diode 60, and the second switching diode 46, preventing the gate voltage of the second transistor 40 from exceeding the threshold voltage.

4. Then, a current passing through the center-tapped primary coil 33 from the first transistor 39 is supplied to the resonant capacitor 37 and the induction coil 23 (23*a*, 23*b*) through the secondary coil 34, the resonant capacitor 37 and the induction coil 23 start resonating at the predetermined frequency, and a voltage across the secondary coil 34 is reversed after a certain time, allowing the voltage of the other end 33*c* of the center-tapped primary coil 33 to fall below the voltage of the one end 33*b*.

5. Then, the charge of the gate of the first transistor 39 passes through the first switching diode 45 and the other end 33*c* of the primary coil 33. When the gate voltage of the first transistor 39 falls below the threshold voltage, the first transistor 39 is turned off (non-conducting). Meanwhile, a charge accumulated in the second lead capacitor 66 of the second closed loop rapidly flows to the gate of the second transistor 40 through the second lead diode 67 and simultaneously flows to the gate of the second transistor 40 through the second branch resistor 59 and the second branch diode 60. The gate voltage of the second transistor 40 quickly reaches at least the threshold voltage, so that the second transistor 40 (conducting) is turned on (the gate of the second transistor 40 is turned on in FIG. 4).

When the second transistor 40 is turned on (conducting), a current passes through the second transistor 40 and the negative output terminal 21*b* of the rectifier 21 from the other end 33*c* of the primary coil 33.

At this point, a voltage is substantially 0 V at the junction point of the other end 33*c* of the center-tapped primary coil 33 and the collector of the second transistor 40. Thus, a charge at the gate of the first transistor 39 flows to the junction point of the other end 33*c* of the center-tapped primary coil 33 and the collector of the second transistor 40 through the first switching diode 45, discharging the gate of the first transistor 39. The first transistor 39 is completely turned off (non-conducting), preventing the gate voltage of the first transistor 39 from exceeding the threshold voltage.

6. At this point, an electromotive force is generated on the tertiary coil 35 by a magnetic flux produced on the primary coil 33 by a current passing through the second transistor 40 and the negative output terminal 21*b* of the rectifier 21 from the other end 33*c* of the primary coil 33. Since the tertiary coil 35 has reversed polarity, an induction current passes through the tertiary coil 35 in the opposite direction from a current passing through the primary coil 33. The induction current passes through the first lead resistor 61, the first lead capacitor 62, the first resistor 64, and the center tap 35*a* of the tertiary coil 35 from the one end 35*b* of the tertiary coil 35, which forms a first closed loop that accumulates a charge in the first lead capacitor 62. Meanwhile, the induction current flows to the junction point of the other end 33*c* of the center-tapped primary coil 33 and the collector of the second transistor 40 from the one end 35b of the tertiary coil 35 through the first lead resistor 61, the first lead capacitor 62, the first lead diode 63, and the first switching diode 45, and flows to the junction point of the other end 33c of the center-tapped primary coil 33 and the collector of the first transistor 39 from the one end 35b of the tertiary coil 35 through the first branch resistor 57, the first branch diode 58, and the first switching diode 45, preventing the gate voltage of the first transistor 39 from exceeding the threshold voltage.

7. Then, a current passing through the center-tapped primary coil 33 from the second transistor 40 is supplied to the resonant capacitor 37 and the induction coil 23 (23a, 23b) through the secondary coil 34, the resonant capacitor 37 and the induction coil 23 start resonating at the predetermined frequency, and the voltage across the secondary coil 34 is reversed after the certain time, allowing the voltage of the one end 33b of the center-tapped primary coil 33 to fall below the voltage of the other end 33c.

8. Then, the charge of the gate of the second transistor 40 passes through the second switching diode 46 and the one end 33b of the primary coil 33. When the gate voltage of the second transistor 40 falls below the threshold voltage, the second transistor 40 is turned off (non-conducting). Meanwhile, a charge accumulated in the first lead capacitor 62 of the first closed loop rapidly flows to the gate of the first transistor 39 through the first lead diode 63 and flows to the gate of the first transistor 39 through the first branch resistor 57 and the first branch diode 58. The gate voltage of the first transistor 39 quickly reaches at least the threshold voltage, so that the first transistor 39 is turned on (conducting).

These operations are repeated to oscillate the circuit.

As has been discussed, the first transistor 39 and the second transistor 40 are alternately turned on (conducting). The direction of a current passing through the primary coil 33 is reversed each time the transistors are alternately turned on.

9. Accordingly, a current passes through the secondary coil 34 alternately in opposite directions. The current is maximized when the frequency of the resonant circuit including the resonant capacitor 37 and the induction coil 23 (23a, 23b) is equal to a resonance frequency (e.g., 12 kHz). Thus, the first transistor 39 and the second transistor 40 are switched at the resonance frequency while being displaced 180° with respect to each other. Specifically, self-oscillation occurs at the resonance frequency of the circuit including the resonant capacitor 37 and the induction coil 23, and an alternating current at the resonance frequency is supplied to the induction coil 23. As shown in FIG. 4, a voltage with the resonance frequency is generated on the primary coil 33 with an envelope of a half-wave voltage waveform outputted from the half-wave rectifier 21.

Hence, power can be supplied from the commercial power supply 11 to the induction coil 23 without the need for an AC-DC converter that may cause power loss, thereby improving power transmission efficiency.

10. In the power receiving unit 70 opposed to the feeding unit 69, a magnetic flux produced on the induction coil 23 generates a large electromotive force on the power receiving coil 24 that resonates at the frequency of the induction coil 23.

The electromotive force allows the passage of an alternating current through the primary winding of the insulating transformer 26 connected in parallel with the power receiving coil 24, and a voltage dropped relative to a voltage on the primary winding is generated on the secondary winding of the insulating transformer 26 according to the turns ratio, allowing the passage of an increased alternating current. The alternating current is supplied to the full-wave rectifier 27, and then a direct current rectified by the full-wave rectifier 27 flows to the lead storage battery 12 through the DC choke 28, charging the lead storage battery 12.

At this point, as has been discussed, a half-cycle waveform of the commercial frequency is generated that pauses substantially like a voltage after the half-wave rectification of the half-wave rectifier 21. The lead storage battery 12 is charged only at a constant current or higher with a half cycle of the commercial frequency, so that the lead storage battery 12 is charged by pulse charging. Thus, the lead storage battery 12 can be quickly charged by pulse charging with a parabolic half-wave current that is not a constant current, thereby further extending the life of the lead storage battery 12.

Even in the case where the configuration of the detailed circuit is directly connected to the alternating commercial power supply 11, the first transistor 39 and the second transistor 40 are stably driven in an alternating manner without delay by the effects of the first startup circuit 51, the second startup circuit 52, the first driving circuit 47, the second driving circuit 48, the first lead circuit 49, and the second lead circuit 50 so as to apply an alternating current to the secondary coil 34 at the predetermined frequency. Thus, the first transistor 39 and the second transistor 40 are less likely to be turned off (non-conducting) at the same time, securing a stable switching operation with higher power transmission efficiency.

What is claimed is:

1. A charging apparatus for charging a lead storage battery by means of a commercial power supply, the charging apparatus comprising:
    a half-wave rectifier that half-wave rectifies an alternating current supplied from the commercial power supply;
    a radiofrequency generating circuit that converts an output current half-wave rectified by the half-wave rectifier to a radiofrequency current with a predetermined frequency and outputs the radiofrequency current;
    an induction coil that is fed with the radiofrequency current from the radiofrequency generating circuit;
    a power receiving coil that is opposed to the induction coil and receives an electromotive force induced by a magnetic flux produced on the induction coil;
    a resonant capacitor that is connected in parallel with the power receiving coil and forms a resonant circuit with the power receiving coil at the predetermined frequency; and
    a full-wave rectifier that full-wave rectifies an output current of the parallel resonant circuit and supplies the current to the lead storage battery.

2. The charging apparatus for a lead storage battery according to claim 1, wherein the lead storage battery is charged from the full-wave rectifier through a DC choke.

3. The charging apparatus for a lead storage battery according to claim 2, further comprising an insulating transformer between the resonant circuit and the full-wave rectifier,
    wherein the current supplied to the lead storage battery is set according to a turns ratio of a primary winding and a secondary winding of the insulating transformer.

4. The charging apparatus for a lead storage battery according to claim 1, further comprising an insulating transformer between the resonant circuit and the full-wave rectifier,
    wherein the current supplied to the lead storage battery is set according to a turns ratio of a primary winding and a secondary winding of the insulating transformer.

5. The charging apparatus for a lead storage battery according to any one of claims 1 to 3, wherein the current supplied to the lead storage battery is made variable by changing a gap between the induction coil and the power receiving coil.

* * * * *